J. Judson,
Governor.
No. 1,889. Reissued Feb. 28, 1865.
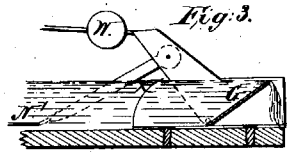
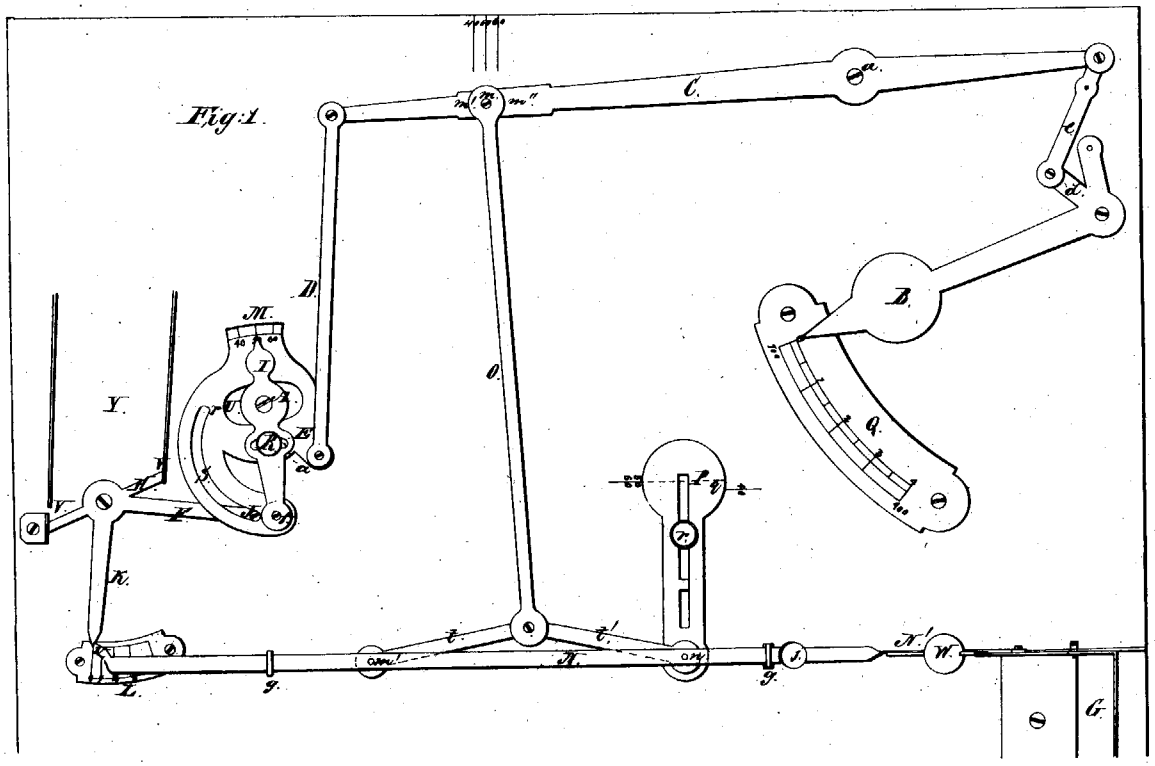
N. PETERS, PHOTO-LITHOGRAPHER, WASHINGTON, D. C.

UNITED STATES PATENT OFFICE.

JUNIUS JUDSON, OF ROCHESTER, NEW YORK.

IMPROVEMENT IN STEAM-ENGINE GOVERNORS.

Specification forming part of Letters Patent No. 7,960, dated March 4, 1851; Reissue No. 1,889, dated February 28, 1865.

*To all whom it may concern:*

Be it known that I, JUNIUS JUDSON, of Rochester, in the county of Monroe and State of New York, have invented certain new and useful Improvements in Apparatus for Governing Mechanical Power, (for which Letters Patent of the United States were granted on the 4th day of March, 1851;) and I do hereby declare that the following is a full and exact description thereof, reference being had to the accompanying drawings, making part of this specification.

Figure 1 is a diagram showing the apparatus as adapted to governing a steam-engine, and also a water-gate, the valve and gate both being closed, so as to shut off the passage of power; Fig. 2, a similar view, but with the valve and gate opened to allow the power to pass; Fig. 3, a view of the water-gate open.

Like letters of reference indicate corresponding parts in all the figures.

My principle of governing motive power applies to steam, water, and other agents. I suppose there is a certain range of speed which may be allowed without detriment to the mechanical operations performed, but that the limits are restricted, and that a pendulum-governor rises and falls only through a limited vertical arc when regulating the supply of motive power to the machinery from one extreme to the other of its appropriate speed, and that any other kind of governor is similarly limited in the range of speed governed. I also suppose when the speed falls to its lowest admissible rate the valve, gate, weir, &c., are nearly or entirely open, and when the speed has attained the highest rate which safety allows it will cause the governor to nearly close the aperture through which the motive power passes. From its lowest to its highest rate, the speed may vary, as is well known, either on account of increased or diminished resistance—that is, the greater or less quantity of work to be done in a given time—or in consequence of increased or diminished force in the motive power, such as the pressure of steam or water. In order to thus regulate the speed so as to insure uniformity, whether the pressure be more or less, or the resistance great or small, various devices have been employed. In steam-engines, a valve has been used in the steam-pipe, connected with the governor in such a manner that when the pressure of the steam is great, thereby causing the governor-balls to rise, the valve will close off a part of the aperture through which the steam passes, and when the pressure is small, thereby allowing the governor-balls to fall, the valve will open the aperture to a greater extent to allow a greater amount of steam to pass to the cylinder; but with an ordinary device of this kind there are many difficulties to overcome.

It is a fact well known to engineers that with a given speed, and with a given resistance or load to overcome, if equal additions be made suddenly to this resistance the governor-balls will, for the instant, fall by the check, through successively unequal spaces, the fall by the first addition of resistance being the greatest, while that by the last will be the least. For instance, if the pressure be eighty pounds to the square inch, and the resistance be two tons, if two tons more resistance be added the governor-balls will fall, say, three degrees; if two tons more be added, they will fall, say, but two degrees; and, still further, if two tons more be added, they will fall, say, but one degree. The valve that admits the steam will be correspondingly opened, at first, three degrees, then two degrees, and then one degree, thus making the valve open successively less and less additional areas when equal amounts of resistance are added. It is obvious that the reverse should be the result, because increased resistance or load to the engine demands increased pressure in the cylinder. This increased pressure reduces the velocity of the flow of steam from the boiler, requiring much larger addition of valve-opening, instead of smaller, as the load increases.

Another difficulty of the ordinary valve is the perturbation and irregularity that ensue in light loads if a portion of the load is suddenly thrown on or taken off. In case a sudden addition is made to the load, the check produced on the governor-balls causes them to open the valve too much, thereby overcharging the cylinder and giving a sudden increase of speed. This sudden increase of speed again raises the balls too high and causes the valve to close off too much of the steam-passage. In this manner, by overcharging and undercharging, steam is admitted to the cylinder irregularly, till finally an equilibrium is produced and the valve settles to its new position. The same effect, only reversed, is produced when resistance is taken from, instead of added to, the given resistance.

To obviate these and other difficulties of the common valve was my object for many years.

In conjunction with Alfred Judson, I invented a valve, patented November 5, 1850, which consisted in making a graduated opening or aperture for the motive power to pass, so arranged that at high speed the valve should add to or close off from the steam-aperture comparatively small areas, while at low speeds it should add to or cut off comparatively large areas, thus reversing the action of the common valve, as before described.

My present invention has the same object in view, and in principle is essentially the same as the other, the only difference being that instead of graduating the opening I produce an equivalent effect, causing the valve to uncover or cover unequal areas of the steam-passage, uncovering or covering more when the speed is low, and less when it is high.

The following description of the drawings will make known the manner in which I effect the objects above specified.

In Figs. 1 and 2 similar parts are referred to by the same letters. Both figures represent the same apparatus, which I have devised to illustrate the action of my machine, but in different positions of all the principal parts.

In Fig. 1 the valve H, which regulates the passage of steam through the pipe Y, is seen to be closed, its two extremities being in contact with the valve-seat V V, and the water-gate G is raised up so as to prevent the passage of water through the weir-channel X. This position of the gate is more fully illustrated in the vertical section, Fig. 3, where G is the gate, W a counter-weight, and N′ a connecting-rod for drawing up and letting down the gate.

In Fig. 2 the valve H and the gate G are both seen to be open.

B represents one of the balls of a pendulum-governor, of which the vertical spindle is not shown.

Q is a scale marking the different elevations to which the balls rise, the lower extremity being marked 40° and the upper 70°.

The connecting-pieces *d* and *e* connect the ball B with the lever C in such a manner that when B is at 70° the arm of the lever with which the connecting-rods O and D are joined is depressed to its lowest point, as seen in Fig. 1, and when B stands at 40° on the arc Q, as in Fig. 2, the connecting-rods are drawn up to the highest elevation.

E is a vibrating cam moved by the action of the connecting-rod D. When D is depressed, the cam comes into such a position that the pin or wrist J comes to the lower extremity of the eccentric slot S, as in Fig. 1, thereby closing the valve H; but when the ball B falls to 40°, as in Fig. 2, the vibration of the cam drawn into the position there represented causes the pin J to be at the upper extremity of slot S, and then the valve H is opened to its greatest extent.

Attached to the valve-stem is an index-rod, K, which in Fig. 1 is seen to point to 0 on the scale L, and in this position also there is no opening of the valve H.

In Fig. 2 the index K points to 4—the highest number on the scale L. The divisions on this scale are unequal—smallest from 0 to 1, and largest from 3 to 4.

The scale Q, over which the pointer on the ball B moves, is also seen to be divided into parts and numbered from 0 to 4; but the divisions are in this case equal.

In the position of the apparatus seen in Fig. 1 the pointer of B is at the zero on Q, and the index K at the zero on L. By the motion of B from 0 to 1, 1 to 2, 2 to 3, &c., the index K will be made to pass successively over unequal and increasing spaces on the arc L, showing that the valve H also opens unequally in the different parts of the range of its motion. By the same descending motion of the ball B from 0 to 4 on its scale Q the elevation of the connecting-rod O from the position in Fig. 1 to that in Fig. 2 raises the two toggle-joints, arms, or progressive levers *t* and *t′* from a nearly horizontal to a highly inclined position; and as the arm *t′* of the toggle has a fixed point or axis, *n*, and the arm *t* a movable axis, *n′*, on the bar N, the change of position of the arms *t* and *t′* from the position in Fig. 1 to that in Fig. 2 causes the end *v* of the bar N to recede from its position at the 0 point over the scale L to that seen in Fig. 2, and by this motion of the bar the gate G is brought down from its inclined position in Figs. 1 and 3 to the horizontal one seen in Fig. 2.

Owing to the progressively-increasing action of the toggle-joint bars, the rate of motion of the lever N is less rapid near the zero-point, Fig. 1, than near the opposite extremity of the scale, where *v* comes over 4, as in Fig. 2.

It is easy to see that when, instead of a gate, a sliding valve is to be regulated, the bar N and the toggle-joint levers *t t′* may be used for that purpose. When both a steam-engine and a water-wheel are used in driving the same machinery, the cam and the toggle-joint may be employed as herein represented, and both operated by the same governor.

In order to adapt the apparatus to the use of high and of low pressure steam, the cam E is made adjustable by means of the index-arm I to different positions over the pressure-arc M, on which are marks indicating the pressure of steam, to which the action of the cam becomes adapted by setting the point of the arm I over the respective numbers. The point *f* is where the adjustable bar is connected with the cam.

By means of the slot *u* and the regulator-nut R the point of the index I is made to assume the required position over the scale M. The axis A will, in consequence of the change of position of the index, (from 40 to 60, for example,) be carried farther away from the point *r* of the slot S. In consequence of this change the total opening of the valve will be less when the governor-balls are at their lowest position, or when the governor, of whatever kind, is running at its lowest speed than when the index I stands at 40 or at 50. The valve might, for example, have the position marked by the dotted line *o'* instead of Fig. 2.

In order to adapt the actions of the gate G to those of the valve H, when acting under different pressures of steam, the fulcrum *m* of the connecting-rod O may be transferred to the point *m'* when the index I is set at 40, or to *m''* when I stands at 60. At the same time the adjustable fulcrum-support P must be so set as to lower or raise the fulcrum *n*, so as to bring the cross-line *q* to correspond with the mark 40, 50, or 60, set upon the support to which the screw *r* fastens the piece P. The numbers 50 and 60 (shown on one and the same line) indicate that between those ranges the support needs no change of position. With these adjustments the gate and valve will be made to act simultaneously and in such a manner as to open to a greater degree near their open extremity and to a less degree near the closed extremity.

I have herein spoken of the action of revolving pendulum-governors, and have explained the operation of my invention in connection with the rising and falling of the arms of that kind of governor; but I wish it to be understood that I do not limit myself to this, and that whatever be the kind of governor used to open and close the valve I shall, by applying my invention to transmit the action of the governor to the valve, gate, &c., to be governed, cause the opening or closing of the valve, &c., when the latter is in the position covering the most of the area of the steam-passage to be greatest, and the opening or closing when the valve covers the least of the area of the steam passage to be less, so as to prevent those alternations of too slow and too rapid speed which arise from the causes herein explained.

I wish it also to be distinctly understood that though I have herein described only the cam and toggle-joint apparatus as the medium of effecting the purpose of my invention, yet that any equivalent devices, giving similar increasing and decreasing action to the valve, gate, &c., may be substituted, for the purpose of causing the action of the governor to affect the valve, or other parts to be governed, to the greatest degree when the speed of the engine is slowest and to the least degree when the speed is fastest, as hereinbefore explained.

What I claim as my invention is—

Communicating the action of a governor to its valve or valves, gate, or equivalent regulating device in such a manner that when the speed of the engine or motor becomes low, either from increase of resistance to overcome or from diminution of pressure of the motive power, the said valve or equivalent will be accelerated or caused to move through a comparatively large space, to uncover or cover a comparatively large area of the valve or gate opening, so as to add to or take from the engine or motor, by a given change of its speed, comparatively large amounts of power; and, also, when the speed becomes high, either from diminution of resistance to overcome or from increase of pressure of the motive power, the said valve or equivalent will be, by a like change of speed, retarded or caused to move through a comparatively small space, to uncover or cover a comparatively small area of valve-opening, so as to add to or take from the engine or motor comparatively small amounts of power for the purpose of securing, as nearly as may be, uniform speed of the engine or motor under all variations of the power or resistance, substantially as herein set forth.

In witness whereof I have hereunto signed my name in the presence of two subscribing witnesses.

JUNIUS JUDSON.

Witnesses:
R. F. OSGOOD,
JNO. L. JUDSON.